(12) United States Patent
Lee et al.

(10) Patent No.: US 9,747,335 B2
(45) Date of Patent: Aug. 29, 2017

(54) GENERIC OPERATOR FRAMEWORK

(71) Applicants:Boyung Lee, Seoul (KR); Ki Hong Kim, Seoul (KR); Yongsik Yoon, Walldorf (DE)

(72) Inventors: Boyung Lee, Seoul (KR); Ki Hong Kim, Seoul (KR); Yongsik Yoon, Walldorf (DE)

(73) Assignee: SAP SE, Walldorf (DE)

( * ) Notice: Subject to any disclaimer, the term of this patent is extended or adjusted under 35 U.S.C. 154(b) by 373 days.

(21) Appl. No.: 14/313,741

(22) Filed: Jun. 24, 2014

(65) Prior Publication Data
US 2015/0370853 A1 Dec. 24, 2015

(51) Int. Cl.
*G06F 17/30* (2006.01)
(52) U.S. Cl.
CPC .. *G06F 17/30442* (2013.01); *G06F 17/30595* (2013.01)
(58) Field of Classification Search
CPC ......... G06F 17/30545; G06F 17/30067; G06F 17/30377; G06F 17/30557; G06F 17/30595; G06F 11/006
USPC ........... 707/600–831, 899, 999.001–999.206
See application file for complete search history.

(56) References Cited

U.S. PATENT DOCUMENTS

| | | | | |
|---|---|---|---|---|
| 6,618,719 B1* | 9/2003 | Andrei | ............... | G06F 17/30471 |
| 7,448,022 B1* | 11/2008 | Ram | .......................... | G06F 8/00 |
| | | | | 717/120 |
| 7,529,752 B2* | 5/2009 | Hinshaw | ........... | G06F 17/30477 |
| 2006/0242102 A1* | 10/2006 | Bruno | ............... | G06F 17/30312 |
| 2008/0010240 A1* | 1/2008 | Zait | .................... | G06F 17/30463 |
| 2009/0228434 A1* | 9/2009 | Krishnamurthy | . | G06F 17/30445 |
| 2010/0306219 A1* | 12/2010 | Sthanikam | ........ | G06F 17/30935 |
| | | | | 707/759 |
| 2011/0295833 A1* | 12/2011 | Narasayya | .......... | G06F 11/3664 |
| | | | | 707/713 |
| 2012/0166469 A1* | 6/2012 | Cammert | .......... | G06F 17/30516 |
| | | | | 707/769 |
| 2014/0281746 A1* | 9/2014 | Ercegovac | .......... | G06F 11/0727 |
| | | | | 714/48 |

* cited by examiner

*Primary Examiner* — Angelica Ruiz
(74) *Attorney, Agent, or Firm* — Brake Hughes Bellerman LLP

(57) ABSTRACT

In accordance with aspects of the disclosure, systems and methods are provided for query optimization including generating a knowledge based container for one or more new operators, building a generic operator structure for the knowledge based container generated for each new operator, and applying optimization rules to each new operator based on the generic operator structure built for each new operator to thereby increase extensibility of the query optimizer using a structured query language (SQL).

20 Claims, 8 Drawing Sheets

GENERIC OPERATOR FRAMEWORK

TECHNICAL FIELD

The present description relates to various computer-based techniques for query optimization.

BACKGROUND

In conventional computing environments, query execution plans may be optimized for efficiency. Query execution plans are used by developers to meet various objectives, such as data access goals. In some scenarios, a developer may manage query optimization based on knowledge and experience. However, this technique is difficult to coordinate, significantly time consuming, and highly complex for managing code when attempting to explain internal operations and functions of a query optimizer. Further, the query optimizer does not typically allow a developer to specify procedures for calculating a desired result. Therefore, a need exists for providing efficient solutions for improved optimization of query execution plans generated in computing environments.

SUMMARY

In accordance with aspects of the disclosure, a computer system may be provided for query optimization including instructions recorded on a computer-readable medium and executable by at least one processor. The computer system may include a generic operator framework configured to cause the at least one processor to generate one or more new operators for a structured query language (SQL) to thereby increase extensibility of a query optimizer using the SQL. The generic operator framework includes an operator generator configured to generate a knowledge based container for each new operator of the one or more new operators. The generic operator framework includes a specification handler configured to build a generic operator structure for the knowledge based container generated for each new operator. The generic operator framework includes a rule applicator configured to apply optimization rules to each new operator based on the generic operator structure built for each new operator to thereby increase extensibility of the query optimizer using the SQL.

In accordance with aspects of the disclosure, a computer program product may be provided, wherein the computer program product is tangibly embodied on a non-transitory computer-readable storage medium and includes instructions that, when executed by at least one processor, may be configured to generate one or more new operators for a structured query language (SQL) to thereby increase extensibility of a query optimizer using the SQL. The instructions may be configured to generate a knowledge based container for each new operator of the one or more new operators. The instructions may be configured to build a generic operator structure for the knowledge based container generated for each new operator. The instructions may be configured to apply optimization rules to each new operator based on the generic operator structure built for each new operator to thereby increase extensibility of the query optimizer using the SQL.

In accordance with aspects of the disclosure, a computer-implemented method may be provided for query optimization. The computer-implemented method may include generating one or more new operators for a structured query language (SQL) to thereby increase extensibility of a query optimizer using the SQL, including generating a knowledge based container for each new operator of the one or more new operators, building a generic operator structure for the knowledge based container generated for each new operator, and applying optimization rules to each new operator based on the generic operator structure built for each new operator to thereby increase extensibility of the query optimizer using the SQL.

The details of one or more implementations are set forth in the accompanying drawings and the description below. Other features will be apparent from the description and drawings, and from the claims.

DETAILED DESCRIPTION

Figure 1:
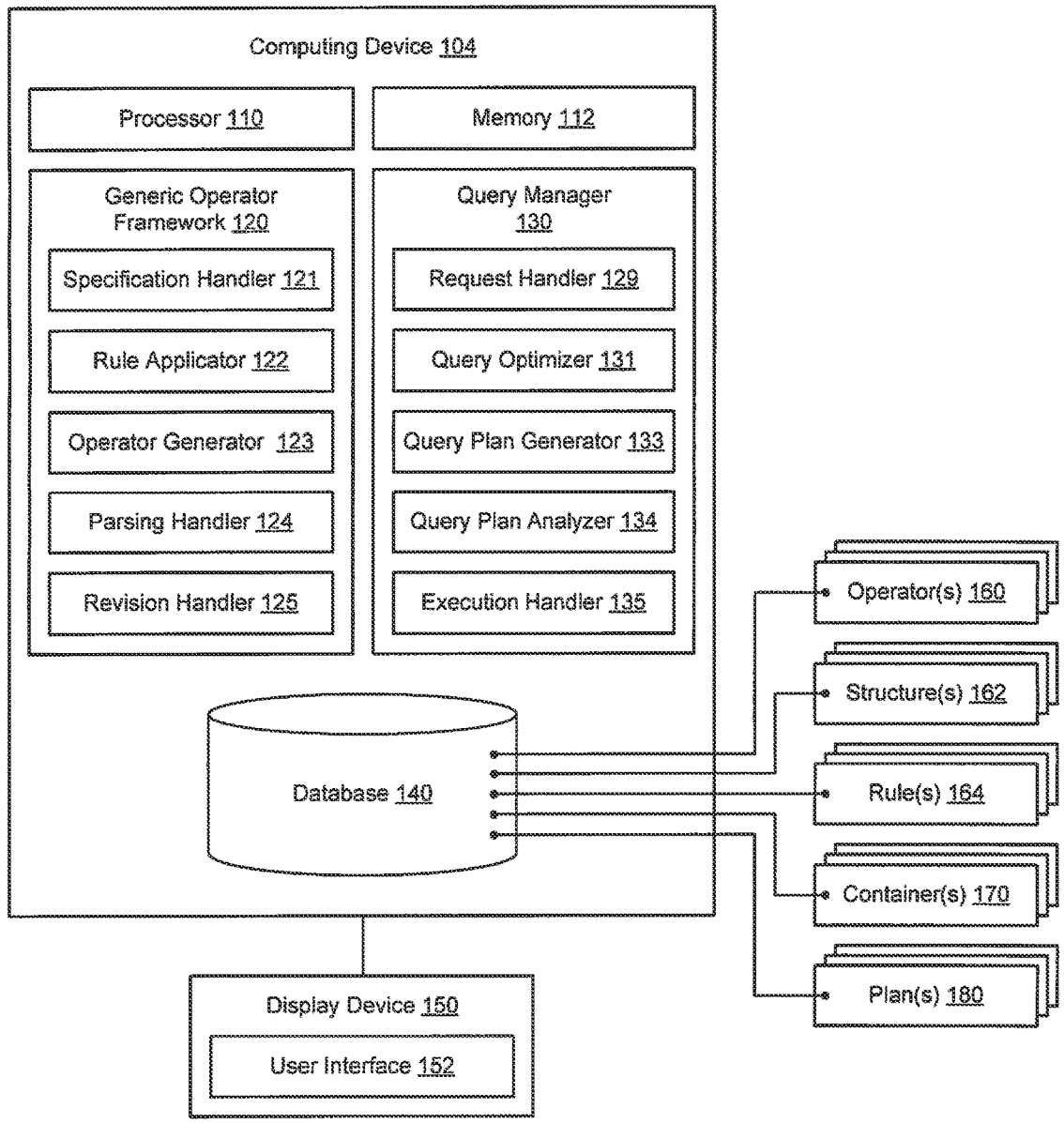
FIG. 1 is an example block diagram showing an example system for query optimization, in accordance with aspects of the disclosure.

FIG. 1 is an example block diagram illustrating an example system 100 for query optimization, in accordance with aspects of the disclosure.

In the example of FIG. 1, the system 100 comprises a computer system for implementing query optimization that may be associated with a computing device 104, thereby transforming the computing device 104 into a special purpose machine designed to implement query optimization process(es), as described herein. In this instance, the computing device 104 may include standard element(s) and/or component(s), including at least one processor(s) 110, memory 112 (e.g., non-transitory computer-readable storage medium), at least one database(s) 140, power, peripherals, and various other computing elements and/or components that may not be specifically shown in FIG. 1. Further, the system 100 may be associated with a display device 150 (e.g., a monitor or other display) that may be used to provide a user interface (UI) 152, such as, in various examples, a graphical user interface (GUI). In some examples, the UI 152 may be used to receive preferences from a user for managing or utilizing the system 100. As such, in some implementations, various other element(s) and/or component(s) of the system 100 that may be useful for purpose of implementing the system 100 may be added or included, as would be apparent to one of ordinary skill in the art.

In the example of FIG. 1, the query optimization system 100 may include the computing device 104 and instructions recorded on the non-transitory computer-readable medium 112 and executable by the at least one processor 110. The system 100 may include the display device 150 for providing output to a user, and the display device 150 may include the UI 152 for receiving input from the user.

In various implementations, the system 100 for query optimization may include a system and related methods for optimizing query execution plans by using and/or implementing generic operators. For instance, the system 100 may include a structured query language (SQL) relational database management system. Generally, SQL refers to a special-purpose programming language designed for managing data held in a relational database management system (RDBMS). In some examples, SQL may refer to various types of data related languages including, e.g., a data definition language and a data manipulation language, where a scope of SQL may include data insert, query, update and delete, schema creation and modification, and data access control, and SQL may include procedural elements. Further, in some example implementations, SQL may include descriptions related to various language elements, including clauses, expressions, predicates, queries, and statements. For instance, clauses may refer to various constituent components of statements and queries, and in some instances, clauses may be considered optional. Further, expressions may be configured to produce scalar values and/or tables that include columns and/or rows of data. Also, predicates may be configured to specify conditions that may be evaluated to SQL three-valued logic (3VL) (true/false/unknown) and/or Boolean truth values, which may be used to moderate effects of statements and queries, and which may be used to modify program flow.

Further, in other instances, queries may be configured to retrieve data from a database based on specified criteria. Generally, queries provide a means for users to describe data for retrieval from a database, thereby providing a database management system (DBMS) with responsibility for planning, optimizing, and/or performing physical operations necessary to produce various desired results. Statements may be configured to enable persistent effect on schemata and data, to thereby control transactions, program flow, connections, sessions, and/or diagnostics.

In another implementation, the system 100 for query optimization may include a system and related methods for increasing and/or improving extensibility of query optimization by using and/or implementing generic operators. For instance, in reference to software engineering, extensibility may refer to implementation of system design features and principles where future growth is considered. In some instances, extensibility may refer to systemic measure of an ability to extend functionality and operations of a system. In some instances, extensibility may refer to an addition of new functionality and/or operational parameters, and extensibility may also refer to a process of modifying existing functionality. Therefore, extensibility may refer to providing some system enhancements, while minimizing impact to existing system functions. Further, as described herein, aspects of the disclosure provide for increasing extensibility of a query optimizer using generic operators. Still further, as described herein, the system 100 may be configured to extend an extensibility of a query optimizer using generic operators.

In the example of FIG. 1, the query optimization system 100 may include a generic operator framework 120 configured to cause the at least one processor 110 to generate one or more new operators 160 for a structured query language (SQL) to thereby increase extensibility of a query optimizer 131 using the SQL. In an implementation, the query optimizer 131 may include a SQL optimizer. As such, aspects of the disclosure are related to providing extensible mechanisms and/or techniques for extending an optimizer framework, such as, for example, the generic operator framework 120. In various example, this may be achieved by adding new operators, in a manner as described herein.

In various implementations, extensibility may refer to defining an ability of a system to implement new functionality through feature extension, whereby internal structure of a system and data flow are least affected or not affected at all. For instance, modifying, changing, and/or recompiling source code may be unnecessary when altering system behavior and/or system performance. In some instances, software systems may be modified for adding new features, operators, and functionalities requested by users, where extensibility enables users (e.g., developers, programmers, administrators, etc.) to expand and/or add software functionality and capability for facilitating systematic reuse of software features. Some techniques for improving extensibility may facilitate use of user selected program routines that may be added and inserted for extended capability to define new data types (e.g., new operators), in a manner as described herein.

The generic operator framework 120 may include a specification handler 121 configured to build a generic operator structure 162 for each new operator 160 of the one or more new operators 160. The generic operator structure 162 may include a signature, including one or more signature components, such as, for instance, a signature input, a signature output, and a signature bypass. The generic operator structure 162 may include related characteristics specified as a catalog, where in some examples, an optimizer may refer to the signature as an operator signature. As such, in some examples, a specification for a generic operator may be in a form of a catalog with a specification for input, output, and bypass, in a manner as described in greater detail herein.

In some implementations, the generic operator structure 162 may include an operator specification including an operator signature defining one or more of an input specification, an output specification, and a bypass specification developed for the generic operator structure 162 specified for each new operator 160.

In some implementations, the generic operator structure 162 may include an operator catalog structure including one or more implementation details specified for each new operator 160 defining one or more functions, characteristics, parameters, and properties specified for each new operator 160.

The generic operator framework 120 may include a rule applicator 122 configured to apply optimization rules 164 to each new operator 160 based on the generic operator structure 162 built for each new operator 160. In some examples, optimization rules may be developed in general by just referring to only operator signatures without knowing operator details. The generic operator structure 162 for each new operator 160 may be configured to provide a more flexible and extensible operator from an optimizer perspective. Thus, in some examples, a type of knowledge-based application container may be provided for efficient query optimization to thereby adapt any type of operator and rules for optimization.

The generic operator framework 120 may include an operator generator 123 configured to generate a knowledge based container 170 for each new operator 160 in response to application of the optimization rules 164 to each new operator 160 to thereby increase extensibility of the query optimizer 131 using the SQL. In some examples, the generic operator framework 120 may be configured to represent an operator as generic so that any type of operator may be dealt with and given details for processing in an optimizer, such as a query optimizer. The generic operator may include any type of operator, and implementation by the generic operator framework 120 may include a catalog to specify one or more characteristics for the operator.

In some implementations, generating a knowledge based container may represent a generic operator (e.g., support a complex operator including a data structure) to increase extensibility of the query optimizer 131. In an example, optimization rules may be developed for the knowledge based container, and a catalog (e.g., an operator catalog structure) may be built for the generic operator based on the optimization rules developed for the knowledge based container.

The generic operator framework 120 may include a parsing handler 124 configured to modify an existing operator structure according to the generic operator structure 162 specified for each new operator 160. For instance, an operator specification may be rewritten to modify, alter, or change one or more of its input specification, output specification, and bypass specification.

The generic operator framework 120 may include a revision handler 125 configured to revise the optimization rules 164 applied to each new operator 160 based on the existing operator structure and the generic operator structure 162 built for each new operator 160. For instance, optimization rules applied to an operator specification may be revised to further modify, alter, or change one or more of its input specification, output specification, and bypass specification.

In the example of FIG. 1, the query optimization system 100 may include request handler 129 configured to receive a request for generating each new operator 160 of the one or more new operators 160. In some examples, a user may describe desired data for a SQL relational database management system, where a query refers to a request for information from a database. Further, a request may refer to a query for generating one or more new operators using generic operators having a generic operator structure to thereby increase extensibility of the query optimizer 131 using the SQL. Further, the request may involve generating a query execution plan (e.g., access plan) to access data based on the generic operators and to define at least one execution path.

In an implementation, the query execution plan(s) may be separate from the query optimizer 131 (e.g., SQL optimizer). In various examples, the query optimizer 131 may be configured to create/generate at least one optimal query execution plan to thereby generate a desired result in an efficient manner. The query optimizer 131 may be configured to create/generate some type of estimation to thereby generate at least one optimal query execution plan.

In various implementations, aspects of the disclosure provide for improved flexibility and extensibility from an optimizer perspective. For instance, aspects of the disclosure may be directed to a knowledge-based application container as an optimizing feature to thereby adapt any type of operators for optimization rules.

In the example of FIG. 1, the query optimization system 100 may include a query manager 130 configured to cause the at least one processor 110 to manage query optimization and generation of query execution plans. In various implementations, the query manager 130 provides for managing creation/generation of at least one optimal query execution plan to thereby provide a desired result in an efficient manner, where estimation may be used to generate at least one optimal execution plan.

The query manager 130 may include the query optimizer 131 configured to determine efficient execution of a query by considering one or more possible query execution plans. In some implementations, the query optimizer 131 may be configured to achieve this by performing various types of optimization including, for example, logical optimization and physical optimization. For instance, the query optimizer 131 may be configured to perform logical optimization to generate a sequence of relational mathematic processes to perform a query. In another instance, the query optimizer 131 may be configured to perform physical optimization to determine a means of executing each operation of a query.

In various implementations, query optimization may be considered a function of a relational database management system (RDBMS). The query optimizer 131 may not allow direct access by users. In some examples, when a query is submitted, the query may be parsed by a parser, and then the query may be passed to the query optimizer 131 for optimization. In some examples, optimizing a query execution plan may include tuning the query execution plan to improve execution performance.

Generally, a query is a request for information from a database, and query results may be generated by accessing relevant data from a database, and manipulating the relevant data to yield requested information. In some examples, database structures may be considered complex, where desired data for a query may be retrieved from a database by accessing data using different ways, with different data structures, and in different orders, which typically affects processing times. For instance, processing times of same queries may vary depending on the manner in which data is retrieved and/or selected from a database. As such, a purpose of query optimization, which may include an automated process, is to select a query that retrieves data from a database in minimal processing time. Generally, varying processing times typically justifies performing query optimization to select an optimal plan to execute a query. Thus, query optimization may be configured to approximate an optimal query execution plan by comparing multiple different query execution plans to select a best query execution plan to thereby generate a best possible result in a least amount of processing time.

In some implementations, the query optimizer 131 may be referred to as a global optimizer or SQL optimizer relying on the generic operator framework (knowledge based container/catalog). Thus, the query optimizer 131 may include a global optimizer (e.g., SQL optimizer), and the global optimizer (e.g., SQL optimizer) may be separate from the at least one execution plan. Further, in various examples, the global optimizer may be configured to create/generate at least one optimal query execution plan to thereby generate a desired result in an efficient manner. In some examples, the global optimizer may be configured to extend the extensibility of the query optimizer 131 using the knowledge based container 170 for each new operator 160 without altering functionality of existing optimization rules. In some other examples, the global optimizer may be configured to extend the extensibility of the query optimizer 131 using the knowledge based container 170 for each new operator 160 by determining whether the query optimizer 131 is able to support each new operator 160. In other implementations, the global optimizer may be configured to extend an extensibility of the query optimizer 131 based on the at least one query execution plan 180.

The query manager 130 may include a query plan generator 133 configured to generate at least one query execution plan 180 to access data and information from a database (e.g., database 140) using the knowledge based container 170 generated for each new operator 160. In some implementations, the at least one query execution plan 180 may be configured to define one or more execution paths for accessing data from the database (e.g., database 140). For instance, a query execution plan may include an database access plan, such as, for example, an ordered set of steps that may be used to access data in a database (e.g., database 140) of the example system 100 (e.g., SQL relational database management system). Since SQL may be considered declarative, there may be various different ways to execute a given query with varying performance. In some implementations, when a query is submitted to a database, the query optimizer 131 may be configured to evaluate one or more possible query execution plans for executing queries and return a best query execution plan. Further, some query execution plans may be manually examined and/or tuned to improve performance.

In some implementations, the system 100 for query optimization may include various mechanisms for returning a query execution plan for a query. In some examples, the system 100 may include a mechanism configured to generate a graphical representation of a query execution plan and/or return a textual description of a query execution plan. In some other examples, the system 100 may include a mechanism for retrieving a query execution plan for querying virtual database tables.

The query manager 130 may include a query plan analyzer 134 configured to evaluate the at least one query execution plan 180 by simulating one or more physical operations associated with each new operator 160. In various implementations, different qualities of a DBMS have different ways of balancing an amount of time spent determining a best query plan and a quality of a selection. In some examples, the query optimizer 131 may include a cost-based query optimizer configured to evaluate resource structures of various different query plans, and use this evaluation as a basis for query plan selection. The query optimizer 131 may be configured to estimate cost to each possible query plan, and select a query plan with least cost. In this example, costs may be used to further estimate runtime cost of evaluating query plans, for instance, in terms of input/output operations needed, CPU path length, amount of disk buffer space, disk storage service time, and interconnect usage between units of parallelism, and various other factors. In other examples, query execution plans may be evaluated based on various possible data access paths and various relational table join techniques. Further, in some other examples, a search space may be sized depending on complexity of SQL queries related to various query execution plans.

The query manager 130 may include an execution handler 135 configured to execute the at least one query execution plan 180 by performing physical operations associated with each new operator 160. In various examples, the execution handler 135 may be configured to execute an optimized query execution plan 180 by performing and/or implementing physical operations. As described herein, the query optimizer 131 may be configured to analyze and/or evaluate multiple different possible query execution plans for executing a query and return a best selected query execution plan. Further, aspects of the disclosure provide for extending the extensibility of the query optimizer 131 for new operators including generic operators having generic operator structures without modifying a functionality and operational integrity of the query optimizer 131.

In the example of FIG. 1, it should be appreciated that the system 100 is illustrated using various functional blocks or modules that represent more-or-less discrete functionality. However, such illustration is provided for clarity and convenience, and thus, it should be appreciated that the various functionalities may overlap or be combined within a described block(s) or module(s), and/or may be implemented by one or more block(s) or module(s) not specifically illustrated in the example of FIG. 1. As such, it should be appreciated that conventional functionality that may be considered useful to the system 100 of FIG. 1 may be included as well even though such conventional elements are not illustrated explicitly, for the sake of clarity and convenience.

Figure 2:
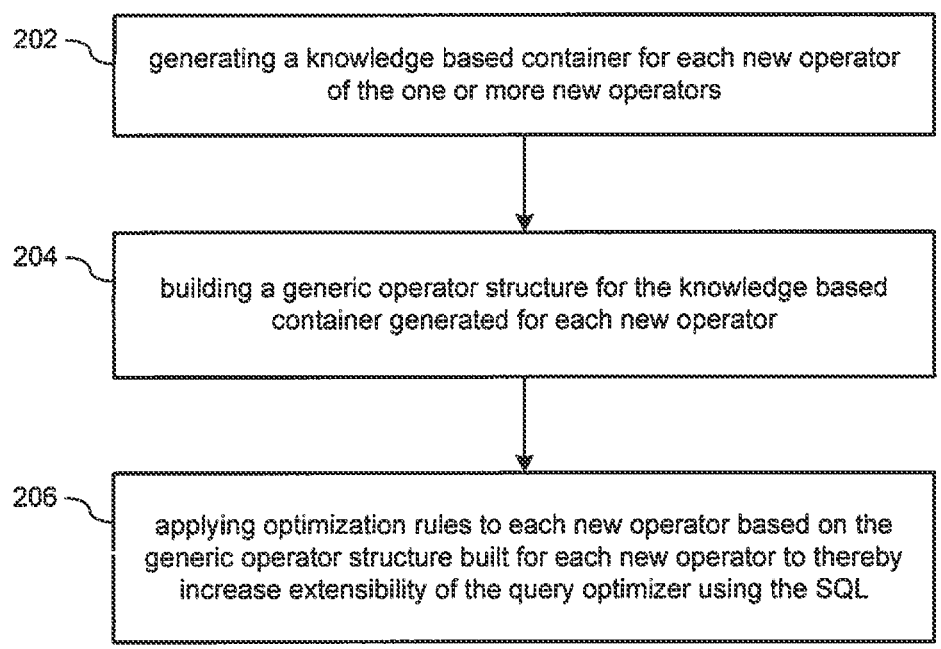
FIG. 2 is an example process flow showing an example method for query optimization, in accordance with aspects of the disclosure.

FIG. 2 is a process flow illustrating an example method 200 for query optimization, in accordance with aspects of the disclosure.

In the example of FIG. 2, operations 202-206 are illustrated as discrete operations occurring in sequential order. However, it should be appreciated that, in other various implementations, two or more of the operations 202-206 may occur in a partially or completely overlapping or parallel manner, or in a nested or looped manner, or may occur in a different order than that shown. Further, additional operations, that may not be specifically shown in the example of FIG. 2, may be included in some implementations, while, in various other implementations, one or more of the operations 202-206 may be omitted. Further, in various implementations, the method 200 may include a process flow for a computer-implemented method for query optimization in the system 100 of FIG. 1. Further, as described herein, the operations 202-206 may provide a simplified operational process flow that may be enacted by the computer system 104 to provide features and functionalities as described in reference to FIG. 1.

In various aspects of the disclosure, the method 200 of FIG. 2 may be provided for generating one or more new operators for a structured query language (SQL) to thereby increase extensibility of a query optimizer using the SQL. At 202, the method 200 may include generating a knowledge based container for each new operator of the one or more new operators. At 204, the method 200 may include building a generic operator structure for the knowledge based container generated for each new operator. In some examples, at 204, the method 200 may include building the generic operator structure for each new operator related to the knowledge based container and/or an operator catalog. At 206, the method 200 may include applying optimization rules to each new operator based on the generic operator structure built for each new operator to thereby increase extensibility of the query optimizer using the SQL. In various examples, the knowledge based container may include a set of one or more generic operator structures.

In various implementations, generating the knowledge based container for each new operator may refer to a new operator implementation step, such as, for example, optimizer development for adding new operators. Further, applying optimization rules to each new operator may include query optimization, which refers to existing operator catalog/knowledge container during query optimization.

In various implementations, the generic operator structure may include an operator specification including an operator signature defining one or more of an input specification, an output specification, and a bypass specification developed for the generic operator structure specified for each new operator. In various implementations, the generic operator structure may include an operator catalog structure including one or more implementation details specified for each new operator defining one or more functions, characteristics, parameters, and properties specified for each new operator.

In some examples, operator structure/signature may be extended if considered necessary or required by optimization rules (e.g., filter pushdown-able column specification), where there may be no need to keep/include operator implementation details.

In some implementations, the method 200 may include receiving a request for generating each new operator of the one or more new operators. The method 200 may include extending the extensibility of a query optimizer using the knowledge based container for each new operator without altering/modifying functionality of the query optimizer. The method 200 may include extending the extensibility of the query optimizer using the knowledge based container for each new operator by determining whether the query optimizer is able to support each new operator. The method 200 may include altering/modifying an existing operator structure according to the generic operator structure specified for each new operator. The method 200 may include revising the optimization rules applied to each new operator based on the existing operator structure and the generic operator structure built for each new operator. The method 200 may include generating at least one query execution plan to access data from a database using the knowledge based container generated for each new operator and defining one or more execution paths for accessing data from a database. In some examples, the at least one query execution plan may be configured to define one or more execution paths for accessing data from a database. The method 200 may include extending the extensibility of the query optimizer based on the at least one query execution plan and evaluate the at least one query execution plan by simulating one or more physical operations associated with each new operator. The method 200 may include executing the at least one query execution plan by performing physical operations associated with each new operator.

Figure 3:
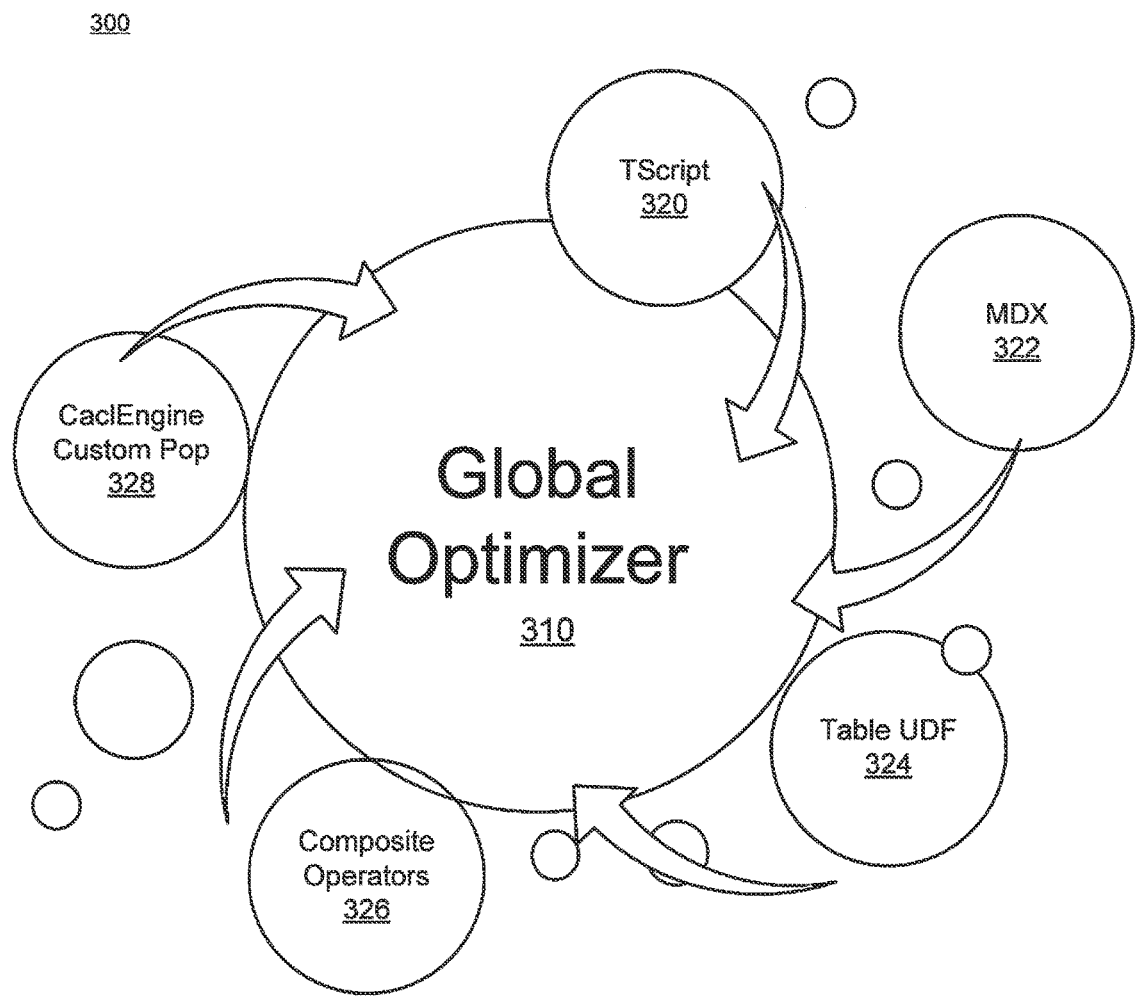
FIG. 3 is an example diagram showing an example overview of providing optimizer extensibility for new operators, in accordance with aspects of the disclosure.

FIG. 3 is a diagram showing an overview 300 of providing optimizer extensibility for new operators, in accordance with aspects of the disclosure.

From a global optimizer perspective, there may be incoming requirements and/or parameters to extend optimizing features to support various types of operations, TScript operations, MDX operations, table UDF operations, user defined operations, composite operators, calculation engine custom pop, and/or various other types of operations, including support complex operations inside an engine. Further, in various implementations, extending optimizer features may be configured for supporting more complex operations and/or complex operators.

In some implementations, aspects of the disclosure may refer to and may be applied toward extensible optimization with addition of new operators, knowledge based rule application, documentation, and explain-ability. For instance, extensible optimization may relate to use of the query optimizer 131 as a global optimizer 310 configured to support various types of operations including, for example, TSCRIPT 320, MDX 322, Table UDF 324, Composite Operators 326, and CalcEngine Custom Pop 328. As such, in various other instances, the query optimizer 131 may be configured as the global optimizer 310 that may be configured to support various other types of operations.

In some examples, TSCRIPT 320 may enable users to implement complex time series-like functionality as a SQL-user defined aggregation function. In some other examples, TSCRIPT 320 may be implemented as an OLAP-plan operation and thus may need an OLAP-cube to run on (e.g., SQL-layer may take care of temp cube creation on demand). While it may be possible to achieve similar functionality using CalcScenarios/L-functions, TSCRIPT 320 may be used to compute a result faster due to its deep integration into an OLAP-engine.

Further, in some examples, a user may implement the functionality using a proprietary TSCRIPT-language, which during query execution may be compiled to and executed by L-functions. The TSCRIPT-script itself may either be part of an issued SQL-statement or stored in a repository and addressed via its repository identifier.

Multi-Dimensional eXpression (MDX) 322 may be generally utilized to manipulate multidimensional information. In some examples, MDX 322 refers to a query language configured for OLAP databases, which for instance may be similar to SQL as a query language for relational databases. In some other examples, MDX 322 may refer to a type of calculation language, e.g., with syntax similar to spreadsheet formulas. Further, the MDX language may provide a specialized syntax for querying and manipulating the multidimensional data stored in OLAP cubes. Recently, MDX is utilized by some OLAP vendors in some OLAP systems.

Table User-Defined Function (UDF) 324 may be generally considered a function provided by a user of a program or environment, where the function may be built into the program or environment. For instance, in an SQL database, a Table UDF 324 may be configured to provide a mechanism for extending functionality of a database server by adding a function that may be evaluated in SQL statements. The SQL standard for a table function may typically return a relational table comprising zero or more rows, with each row having one or more columns.

Composite Operators 326 may be generally considered similar to user defined types and/or functions, where user-defined composite operators may assist with code reuse and readability. In some examples, composite operators may be configured to encapsulate a stream sub-graph for use in different contexts. In some other examples, composite operators may be self-contained in that their stream graph may not include output or input ports and may not include mandatory parameters.

CalcEngine Custom Pop 328 may be generally considered a custom stack function used by a calculation engine. In some examples, the computing related term pop refers to a scripting process of taking something from a top of a list. In other examples, the pop function may allow for processing calculations within other calculations, where combinations of functions, values, fields, and/or operators may be used to provide some desired result that includes some new data for scripting.

In some implementations, the example system 100 for query optimization provides optimizer extensibility for new operators. The example system 100 may include a structured query language (SQL) query optimizer. The optimizer may be structured as an extensible optimizer and include global optimizing capability for new operators as a global optimizer. As described herein, the example system 100 including the optimizer may be configured for facilitating addition of new operators, facilitate knowledge based rule application, and facilitate documentation and explain-ability.

In some implementations, the example system 100 for query optimization provides rule application capability for new operators including generic operators. In some examples, operator structure (or signature) may need to be extended for each and every new operator addition including generic operators.

Figure 4A:
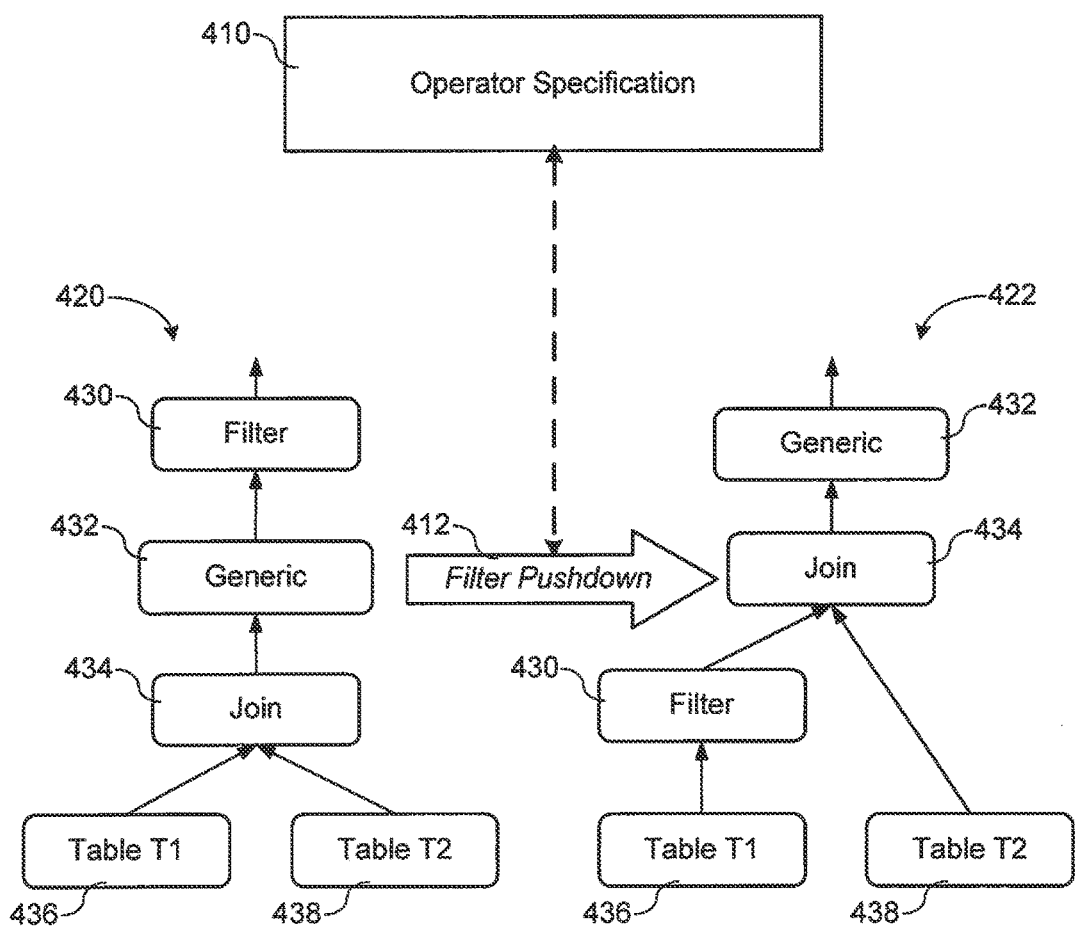
FIGS. 4A-4C are example diagrams showing example applications for a generic operator, in accordance with aspects of the disclosure.
Figure 4B:
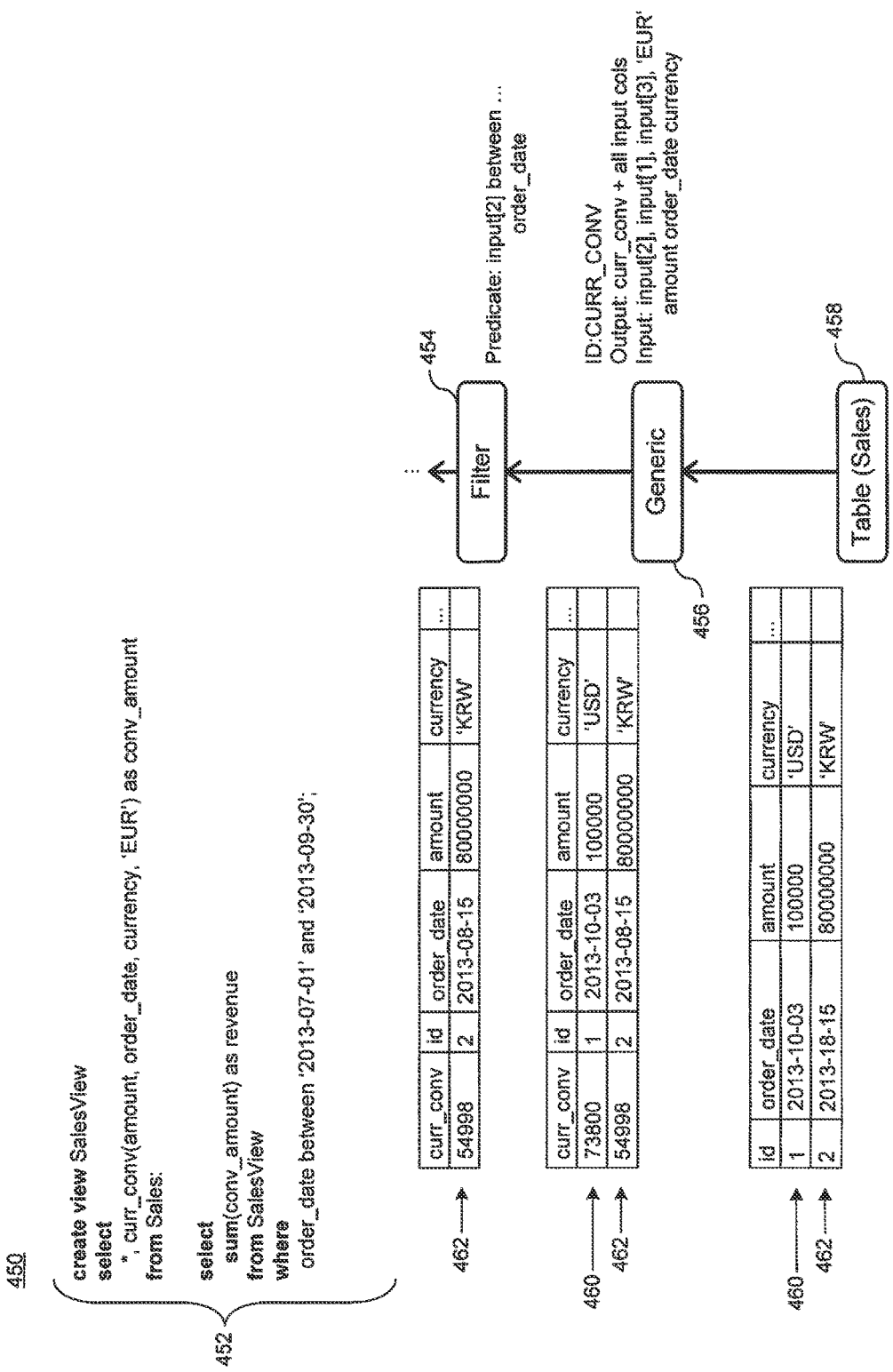
Figure 4C:
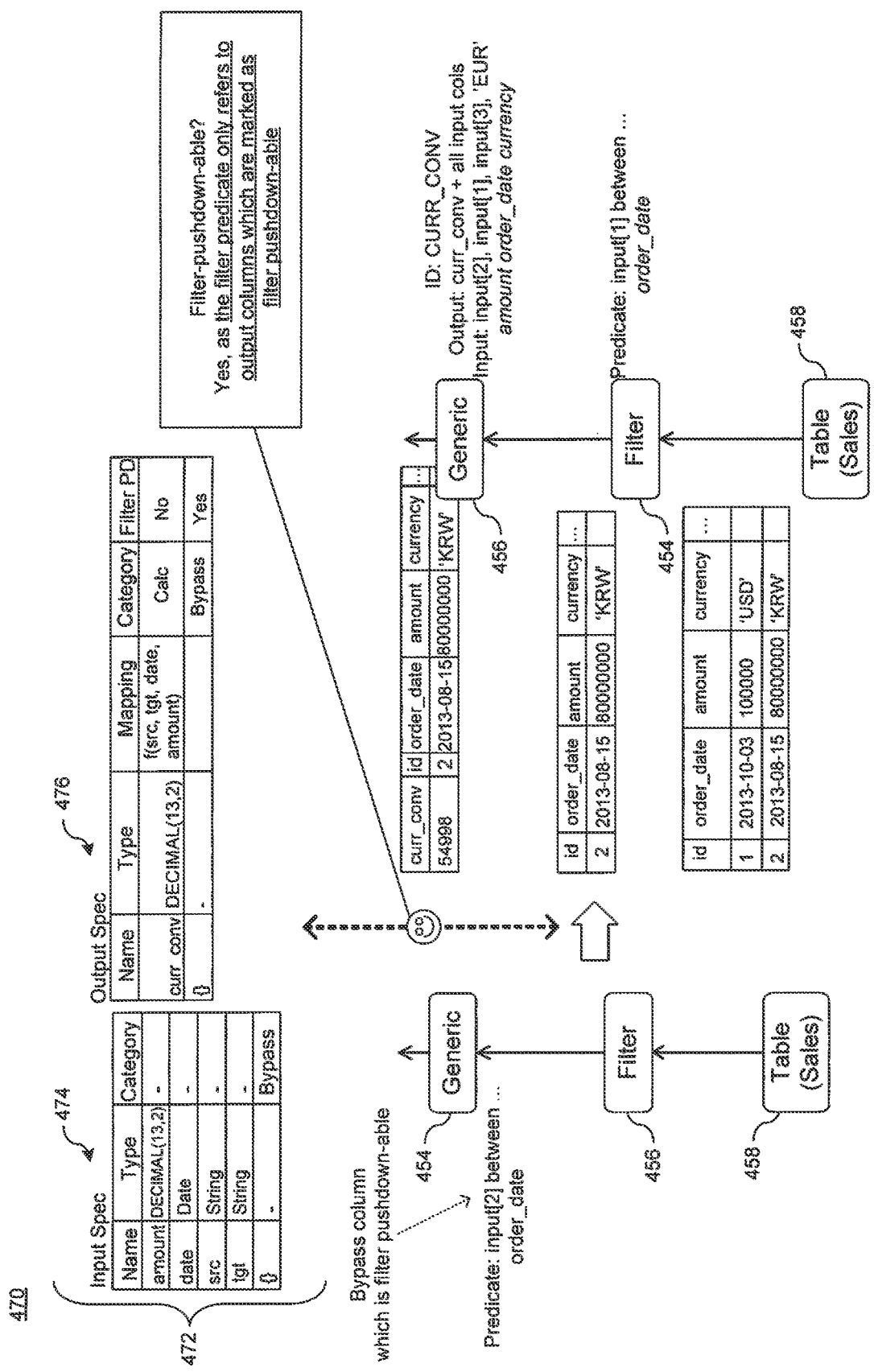

FIGS. 4A-4C are example diagrams showing example applications for a generic operator, in accordance with aspects of the disclosure. In particular, FIG. 4A is a diagram

400 showing an example rule application for a generic operator related to a filter pushdown example 412, in accordance with aspects of the disclosure.

For instance, in the example of FIG. 4A, an operator specification 410 is used to provide a representation of an operator as generic so that any type of operator may be used by providing details to an optimizer. Rules applied to the generic operator may rely on the operator specification 410.

In a first process 420, a first table T1 436 and a second table T2 438 are joined 434, and a generic operator 432 is then applied to the joined tables 436, 438 prior to filtering 430. In a second process 422, the filter 430 is pushed down in the process 422 by applying the filter 430 to the first table T1 436 before joining 434 with the second table T2 438, and the generic operator 432 is then applied to the joined tables 436, 438.

In reference to example pseudo code provided below, code for an operator may refer to the filter push down example 412 to provide a filter pushed down effect on a filter. This means that a generic operator is given one or more conditions for push down through the generic operator, where this code may be configured to check a push-down-ability of the filter. In this example, a generic operator may include any type of operator. Implementing this type of generic operator framework may refer to a type of catalog that specifies some type of characteristics from the operator. In this example, the filter is positioned before or prior to the generic operator, and then after the generic operator, the generic operator is repositioned to provide the filter push down example 412.

In the example of FIG. 4A, the rule application for the generic operator 432 is shown in the filter pushdown example. In some implementations, the rule may be extended to one or more, or each and every new operator addition. Further, in some examples, the rule may rely on the operator specification.

```
// Pseudo code (filter pushdown example)
if (GenericOp->isPushDownableFilter(selectOp->filter_pred))
{
    doSelectThruBuiltIn(selectOp, GenericOp, optCtxt);
}
bool qo_Generic::isPushDownableFilter(qo_Pred * filter_pred)
{
    vetcor<qo_Exp *> exprs=
        OperatorSpec::getFilterPushdownableCols(this->getOpType( ));
    return qo_Utils::isPredInExprs(exprs, filter_pred);
}
```

Further, in reference to the example of FIG. 4A, from the first process 420 to the second process 422, the filter is pushed down to the first table T1 436 prior to joining the two tables 436, 438. This type of optimization pushes the filter 430 down to the table as much as possible, and since the filter 430 is processed before joining, then any following steps may be considered more efficient due to generation limited results without having to filter table T2 records that does not satisfy filter conditions.

FIG. 4B is an example diagram 450 showing an example rule application for a generic operator related to the filter pushdown example of FIG. 4A, in accordance with aspects of the disclosure. In particular, FIG. 4B shows the example diagram 450 of filter pushdown through a generic operator example.

In reference to example pseudo code 452, the filter may be pushed down across a built-in operator to thereby, for instance, process currency conversion for only interesting rows.

```
// Pseudo code (filter pushdown example 452)
create view SalesView
select
    *, curr_conv(amount, order_date, currency, 'EUR') as
conv_amount from Sales;
select
    sum(conv_amount) as revenue
from SalesView
where
    order_date between '2013-07-01' and '2013-09-30';
In reference to filter 454,
Predicate: input[2] between ...
order_date
In reference to generic operator 456,
ID: CURR_CONV
Output: curr_conv + all input cols
Input: input[2], input[1], input[3], 'EUR'
amountorder_datecurrency
```

In reference to the example (sales) table 458, two line entries are included in tabular format including a first line entry 460 and a second line entry 462.

From the table 458, the generic operator 456 of currency conversion (curr-conv) is applied to the first and second line entries 460, 462.

From the generic operator 456, the filter 454 is applied to the two table entries, so that the first line entry 460 is filtered out of a result, and only the second entry 462 remain in the result.

FIG. 4C is an example diagram 470 showing an example rule application for a generic operator related to filter pushdown examples of FIGS. 4A-4B, in accordance with aspects of the disclosure. In particular, FIG. 4C shows the example diagram 470 of filter pushdown through a generic operator example.

In reference to example diagram 470, a generic catalog structure 472 may be generated to include an input specification 474, an output specification 476, and a bypass specification 478. In some implementations, the generic catalog structure 472 may be used to optimize data access of the table 458 by determining whether the filter is pushdownable. For instance, referring to the following pseudo code, the filter predicate only refers to output columns that are marked as filter pushdown-able.

Figure 5:
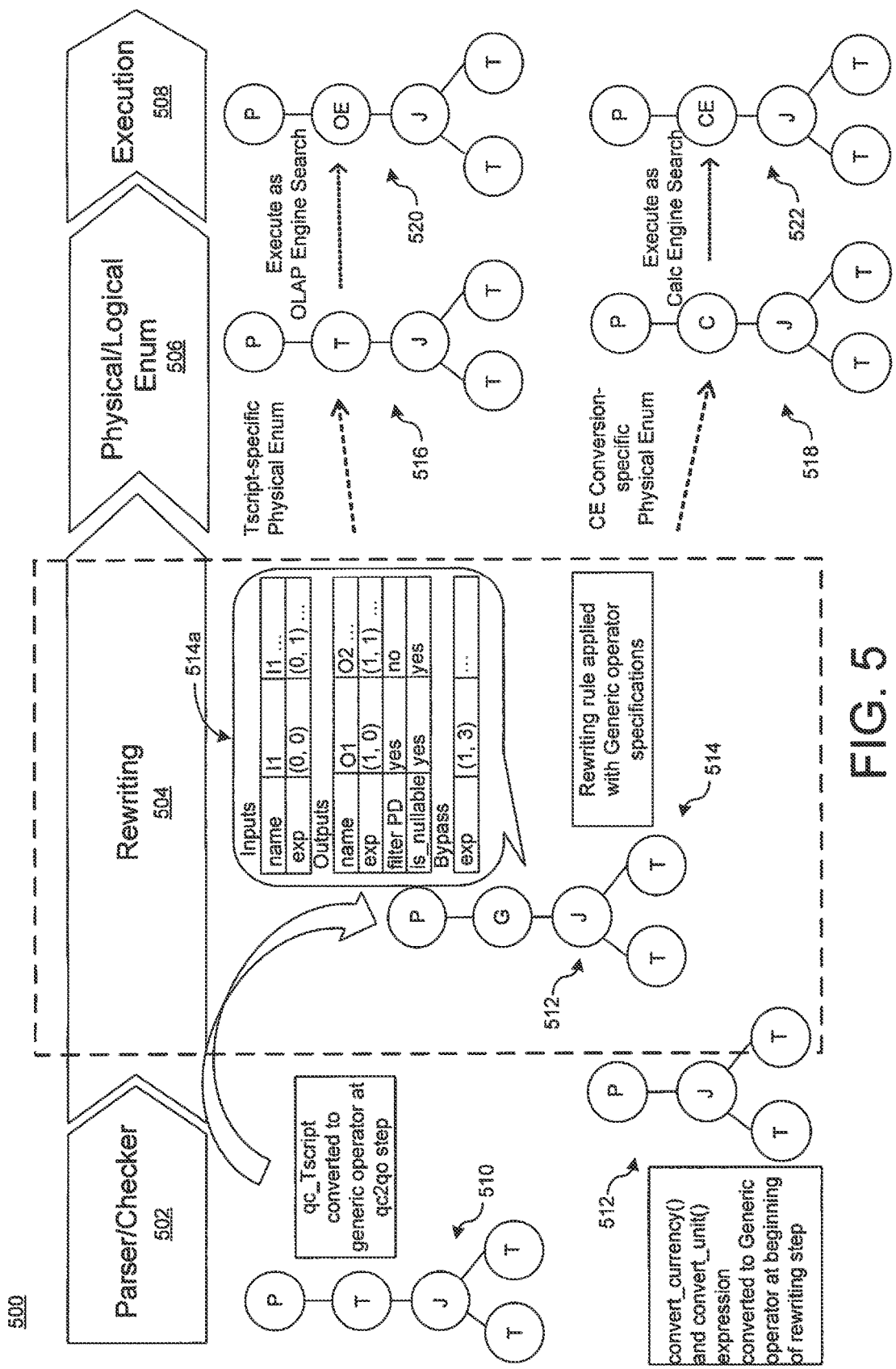
FIG. 5 is an example diagram showing an example generic operator, in accordance with aspects of the disclosure.

Bypass column 478 is filter pushdown-able:
Predicate: input[2] between . . .
    order_date
ID: CURR_CONV
Output: Curr_conv+all input cols
Input: input[2], input[1], input[3], 'EUR'
    amountorder_datecurrency
Predicate: input[1] between . . . order_date FIG. 5 is an example diagram 500 showing an example application of generic operators, in accordance with aspects of the disclosure.

In some examples, query optimizers may be configured to represent query plans as a tree of plan nodes that may encapsulate operations for executing a query. The plan nodes may be arranged in a tree structure, where result results flow from a lower portion of the tree to an upper portion of the tree. Each node may include zero or more child nodes, where output from child nodes are fed as input to related parent nodes. For instance, a join node may include two child nodes that may represent two join operands, whereas a sort node may include a single child node with the input for sorting. Leaves of the tree may include nodes that produce results by scanning tables, including performing index scans and/or sequential scans.

In some examples, performance of a query plan may be determined by an order in which tables may be joined. For instance, when joining multiple tables A, B, C of exponential sizes of 10 rows, 1,000 rows, and 100,000 rows, a query plan that joins B and C may be tasked with more execution time than one that joins A and C. As such, some query optimizers may determine join order via dynamic programming that involves computing each path to access each relation in the query. Sequential scans and index scans may be used for determining relations and answering predicates in a query.

For each relation, the query optimizer may record most efficient manner in which to scan the relation, and further, the query optimizer may record scans of relations that access records in a specifically sorted order. The query optimizer may consider combining relations for which a join condition exists. For combined relations, the query optimizer may consider and preserve the most efficient ways to join relations, along with the most efficient ways to join relations that produce output of a specific sort order.

Then, all three-relation query plans may be computed by joining each two-relation plan produced by a previous phase with remaining relations in the query. Sort order may avoid a redundant sort operation in processing the query. Further, a particular sort order may improve subsequent joins due to clusters of data in a specific manner.

In the example of FIG. 5, the diagram 500 shows an example process flow including application of a generic operator (G), as applied to a TScript/Currency Conversion/Unit Conversion Example.

The process flow of the diagram 500 includes various processes related to a parser/checker process 502, a rewriting process 504, a physical/logical enumeration process 506, and an execution process 508.

The parser/checker process 502 refers to a first structure 510 including a projection operator (P), a TScript operator (T), a join operator (J), and tables (T).

// Pseudo code (first structure 510)
qc_Tscript converted to Generic Operator at qc2qo step The parser/checker process 502 refers to a second structure 512 including the projection operator (P), the join operator (J), and tables (T). In an example, as shown in FIG. 5, the TScript (T) operator may be removed for replacing with a generic operator having a generic operator specification including input, output, and bypass.

// Pseudo code (first structure 512)
convert_currency( ) and convert_unit( )
expression converted to Generic Operator at beginning of rewriting step The rewriting process 504 refers to a rewriting rule that may be applied with generic operator specifications. In some implementations, the rewriting process 504 refers to a third structure 514 including the projection operator (P), a generic operator (G), the join operator (J), and tables (T). In an example, as shown in FIG. 5, the TScript (T) operator is removed and replaced with the generic operator (G) having the generic operator specification 514a including an input specification, an output specification, and a bypass specification.

In an implementation, the generic operator (G) refers to a generic operator structure including the generic operator specification 514a having an operator signature defining an input specification, an output specification, and a bypass specification that may be developed for the generic operator structure specified for each new operator.

In another implementation, the generic operator (G) refers to a generic operator structure including the generic operator specification 514a as an operator catalog structure having input, output, and bypass specifications related to implementation details specified for each new operator, which may define one or more functions, characteristics, parameters, and properties specified for each new operator.

In an implementation, the physical/logical enumeration process 506 may refer to a fourth structure 516 for TScript-specific physical enumeration including the projection operator (P), the TScript operator (T) generated with the generic operator, the join operator (J), and tables (T).

Further, in this implementation, the execution process 508 may refer to a sixth structure 520 for execution of an execution plan including the projection operator (P), an online analytical processing (OLAP) engine search (OE) with use of the generic operator, the join operator (J), and tables (T).

In another implementation, the physical/logical enumeration process 506 may refer to a fifth structure 518 for calculation engine (CE) conversion-specific physical enumeration including the projection operator (P), a conversion operator (C) generated with the generic operator, the join operator (J), and tables (T).

Further, in this implementation, the execution process 508 may refer to a seventh structure 522 for execution of another execution plan including the projection operator (P), a calculation engine search (CE) with use of the generic operator, the join operator (J), and tables (T).

Generally, the process of adding an operator without a generic operator is difficult to maintain. Typically, conventional techniques are designed to run processes with pre-defined set of operators.

In contrast to conventional techniques, aspects of the disclosure refer to techniques for adding new operators with generic operators including generic operator structures and specifications, which may include one or more of input, output, and/or bypass specifications plus optional methods for optimization.

Further, in contrast to conventional techniques, aspects of the disclosure refer to techniques for adding new operators with a generic operator to operator catalog process. In various implementations, this technique may be used to reduce hard-coded parts (query plan rewriting, logical/physical plan enumeration, code generation, etc.). In various implementations, this technique may be used to enhance query plan transformation/optimization rules and operator signature structure, in a manner as described herein.

In some implementations, a generic function type of catalog may be used to develop a generic operator with a type of signature, which refers to a signature input, output, and bypass. The signature may refer to types of characteristics that may be specified in the catalog, and may be not in the code. During a writing of an optimization step, the optimizer may refer to this type of signature, such as an operator signature.

For instance, in reference to FIG. 5, the generic operator specification 514a includes an input specification, an output specification, and a bypass specification, and there is an output, output name O1 which enables filter pushdown (filter PD=yes), and output O2. In reference to filter pushdown, if there is a filter on O1, the filter may be pushed down to push it through this generic operator. However, if there is a filter on O2, then this filter may not be pushed down to the generic operator. Thus, a type of filter that may or may not be pushed down, or why the filter may or may not be pushed down, may be detected by analyzing this type of catalog (i.e., generic operator catalog structure and specification).

In various implementations, this type of generic operator framework may be used for TScript, unit/currency conversion, and any composite operators. The generic operator may refer to the conventional relational operators, or refer to the TScript operator, or refer to a unit/currency conversion operator in the calculation engine. However, from the optimizer's perspective, the operator is simply interpreted as a generic operator. For instance, the type of generic operation that provides an operational function, from the optimizer's perspective, doesn't matter. As such, optimizers simply read the specified type of input/output properties and perform optimization without knowing the specific type of operator.

In various implementations, this type of generic operator may be needed to generate a query execution plan after optimization. In some examples, a query execution plan may be generated based on reference to this type of generic operator to then create a type of TScript operator, unit/currency conversion operator, and/or conventional relational operators. So then, the optimizer may not need to know an actual type of the operator, and thus no additional coding when the operator is added to the engine. From the optimizer's perspective, registering this type of operator specification may be enough, so there is no need to touch optimizer internals.

Figure 6:
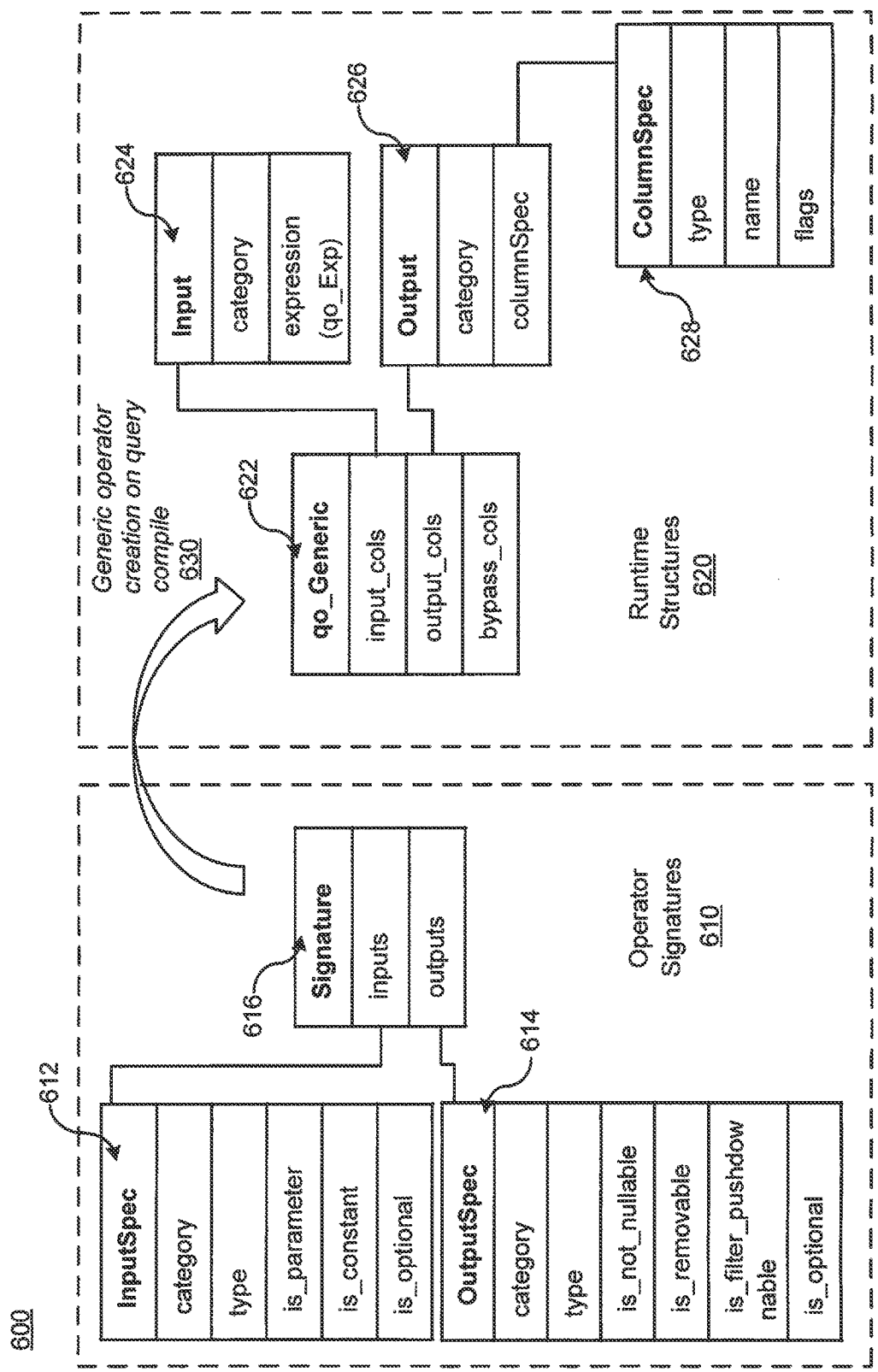
FIG. 6 is an example diagram showing an example generic operator structure, in accordance with aspects of the disclosure.

FIG. 6 is an example block diagram 600 showing an example generic operator structure, in accordance with aspects of the disclosure. In particular, FIG. 6 refers to operator signatures 610 and runtime structures 620.

In some implementations, the operator signatures 610 refer to an input specification 612 and an output specification 614 that may be used to develop the generic signature 616 having input and output parameters. In an example, the input specification (InputSpec) 612 may include one or more parameters and/or characteristics including, for instance, category, type, is_parameter, is_constant, and/or is_optional. In another example, the output specification (OutputSpec) 614 may include one or more parameters and/or characteristics including, for instance, category, type is_not_nullable, is_removeable, is_filter_pushdownable, and/or is_optional.

In some implementations, the runtime structures 612 refer to a generic operator 622 including input parameters 624 and output parameters 626, which may include column specifications 628. In an example, the generic operator (go_Generic) 622 may include one or more parameters and/or characteristics including, for instance, input_cols, output_cols, and/or bypass_cols. In another example, the input parameters (Input) 624 may include one or more parameters and/or characteristics including, for instance, category and/or expression (go_Exp). In another example, the output parameters (Output) 624 may include one or more parameters and/or characteristics including, for instance, category and/or columnSpec. In another example, the column specification (ColumnSpec) 628 may include one or more parameters and/or characteristics including, for instance, type, name, and/or flags.

In some implementations, the operator signature 616 may be used to create or generate the generic operator 622 on query compile 630. Thus, in some examples, a generic operator framework may be configured to generate one or more new operators for a structured query language (SQL) to thereby increase extensibility of a query optimizer using the SQL. The generic operator framework may include a specification handler that may be configured to build a generic operator structure for each new operator of the one or more new operators. The generic operator framework may include a rule applicator that may be configured to apply optimization rules to each new operator based on the generic operator structure built for each new operator. The generic operator framework may include an operator generator that may be configured to generate a knowledge based container for each new operator in response to application of the optimization rules to each new operator to thereby increase extensibility of the query optimizer using the SQL.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, may be written in any form of programming language, including compiled or interpreted languages, and may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any type of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for user interaction, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other types of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of networks, such as communication networks, may include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A computer system including instructions recorded on a non-transitory computer-readable medium and executable by at least one processor, the system comprising:
    an operator generator configured to generate a new operator to add to a structured query language (SQL) query optimization process of a query by a query optimizer under a generic operator framework,
    wherein, under the generic operator framework, the new operator has a generic operator data structure that includes specifications for input attributes, output attributes and bypass attributes of the new operator;
    a knowledge base container configured to hold the generic operator data structure of the new operator;
    a specification handler configured to build, on query compile, the generic operator data structure of the new operator with reference only to the specifications for input attributes, output attributes and bypass attributes of the new operator; and
    a rule applicator coupled to the query optimizer, the rule applicator configured to apply optimization rules based on the generic operator data structure of the new operator during the structured query language (SQL) query optimization process of the query optimizer.

2. The system of claim 1, wherein the generic operator data structure includes a table defining the input attributes, output attributes and bypass attributes of the new operator.

3. The system of claim 1, wherein the generic operator data structure includes an operator catalog structure including one or more implementation details specified for the new operator defining one or more functions, characteristics, parameters, and properties specified for the generic operator.

4. The system of claim 1, wherein the system further comprises:
    a request handler configured to receive a request for generating the new operator.

5. The system of claim 1, wherein the generic operator framework further includes:
    a parsing handler to modify an existing operator structure according to the generic operator data structure specified for the new operator.

6. The system of claim 1, wherein the generic operator framework further includes:
    a revision handler to revise the optimization rules applied to the new operator based on an existing operator structure and the generic operator data structure.

7. The system of claim 1, wherein the generic operator framework is to generate the new operator for the SQL using the knowledge based container without altering functionality of the query optimizer.

8. The system of claim 1, wherein the generic operator framework is to generate the new operator for the SQL using the knowledge based container by determining whether the query optimizer is able to support the new operator.

9. The system of claim 1, wherein the system further comprises:
    a query plan generator to generate at least one query execution plan to access data from a database using the knowledge based container, wherein the generic operator framework extends the query optimizer based on the query execution plan.

10. The system of claim 9, wherein the at least one query execution plan defines one or more execution paths for accessing data from the database.

11. The system of claim 9, wherein the system further comprises:
    a query plan analyzer to evaluate the at least one query execution plan by simulating one or more physical operations associated with the new operator.

12. The system of claim 9, wherein the system further comprises:
    an execution handler to execute the at least one query execution plan by performing physical operations associated with the new operator.

13. A computer program product, the computer program product tangibly embodied on a non-transitory computer-readable storage medium and including instructions that, when executed by at least one processor, are configured to:
    generate a new operator to add to a structured query language (SQL) query optimization process of a query by a query optimizer under a generic operator framework,
    wherein, under the generic operator framework, the new operator has a generic operator data structure that includes specifications for input attributes, output attributes and bypass attributes of the new operator;
    hold the generic operator data structure of the new operator in a knowledge base container;
    build, on query compile, the generic operator data structure of the new operator with reference only to the specifications for input attributes, output attributes and bypass attributes of the new operator; and
    apply optimization rules based on the generic operator data structure of the new operator during the structured query language (SQL) query optimization process of the query by the query optimizer.

14. The computer program product of claim 13, wherein the generic operator data structure includes a table defining the input attributes, output attributes and bypass attributes of the new operator.

15. The computer program product of claim 13, wherein the generic operator data structure includes an operator catalog structure including one or more implementation details specified for the new operator defining one or more functions, characteristics, parameters, and properties specified for the new operator.

16. The computer program product of claim 13, the instructions further configured to:
    receive a request for generating the new operator; and
    extend the query optimizer using the knowledge based container for the new operator without altering functionality of the query optimizer.

17. The computer program product of claim 13, the instructions further configured to:
    receive a request for generating the new operator; and extend the query optimizer using the knowledge based container by determining whether the query optimizer is able to support the new operator.

18. The computer program product of claim 13, the instructions further configured to:
modify an existing operator structure according to the generic operator data structure specified for the new operator; and
revise the optimization rules applied to the generic operator based on the existing operator structure and the generic operator data structure built for the new operator.

19. The computer program product of claim 13, the instructions further configured to:
generate at least one query execution plan to access data from a database using the knowledge based container and define one or more execution paths for accessing data from the database;
extend the query optimizer based on the at least one query execution plan and evaluate the at least one query execution plan by simulating one or more physical operations associated with the new operator; and
execute the at least one query execution plan by performing physical operations associated with the new operator.

20. A computer-implemented method, comprising:
generating a new operator to add to a structured query language (SQL) query optimization process of a query by a query optimizer under a generic operator framework,
wherein, under the generic operator framework, the new operator has a generic operator data structure that includes specifications for input attributes, output attributes and bypass attributes of the new operator;
holding the generic operator data structure of the new operator in a knowledge base container;
building, on query compile, the generic operator data structure of the new operator with reference only to the specifications for input attributes, output attributes and bypass attributes of the new operator; and
applying optimization rules based on the generic operator data structure of the new operator during the structured query language (SQL) query optimization process of the query by the query optimizer.

* * * * *